US 6,587,849 B1

(12) United States Patent
Mason et al.

(10) Patent No.: US 6,587,849 B1
(45) Date of Patent: Jul. 1, 2003

(54) METHOD AND SYSTEM FOR CONSTRUCTING PERSONALIZED RESULT SETS

(75) Inventors: Robert Mason, Somerville, MA (US); Natalya Hung, Foster City, CA (US); Joseph Berkovitz, Sudbury, MA (US)

(73) Assignee: Art Technology Group, Inc., Cambridge, MA (US)

( * ) Notice: Subject to any disclaimer, the term of this patent is extended or adjusted under 35 U.S.C. 154(b) by 0 days.

(21) Appl. No.: 09/459,224

(22) Filed: Dec. 10, 1999

(51) Int. Cl.7 .............................. G06F 17/30; G06F 7/00
(52) U.S. Cl. ................................................ 707/5; 707/6
(58) Field of Search ........................ 707/5, 6, 103 W; 395/200

(56) References Cited

U.S. PATENT DOCUMENTS

| | | | | |
|---|---|---|---|---|
| 5,774,661 A | * | 6/1998 | Chatterjee et al. | 395/200 |
| 5,913,214 A | | 6/1999 | Madnick et al. | 707/10 |
| 6,115,709 A | * | 9/2000 | Gilmour et al. | 707/9 |

OTHER PUBLICATIONS

Daruwala, A. et al: "The Context Interchange Network Prototype", Database Applications Semantics. Proceedings of the IFIP WG 2.6 Working Conference on Database Application Semantics, May 30, 1995, pp. 65–92.

Liu, L. et al: "An Adaptive Approach to Query Mediation Across Heterogeneous Information Sources", Cooperative Information Systems, 1996 Proceedings, First IFCIS International Conference on Brussels, Belgium 1 Jun. 19–21, 1996, Los Alamitos, CA, IEEE Comput. Soc. P. US, pp. 144–156.

Papazoglou M. P. et al.: "A Translation Protocol Achieving Consensus of Semantics between Cooperating Heterogeneous Database Systems", Cooperative Information Systems, 1996 Proceedings, First IFCIS International Conference on Brussels, Belgium Jun. 19–21, 1996, Los Alamitos, CA, IEEE Comput. Soc. P., pp. 78–89.

* cited by examiner

*Primary Examiner*—Safet Metjahic
*Assistant Examiner*—Cindy Nguyen
(74) *Attorney, Agent, or Firm*—Hale and Dorr LLP (57) ABSTRACT

A computer systems includes a rule engine, one or more repository interfaces, and corresponding repositories. The repositories typically contain content or profile information about users. The rule engine provides rules in a uniform format which can be translated, through use of the repository interfaces, into queries specific for the corresponding repositories. Before translating the rules, context objects referenced in the rules are resolved and the corresponding attribute values are inserted into the rules. The resulting rule is simplified where possible because of the attribute values, so that only those queries that need to be made to a repository are made.

23 Claims, 4 Drawing Sheets

Item Descriptor

| Attribute | Data Type | Req. | RWQ | Purpose/Function |
|---|---|---|---|---|
| 44 | 46 | 48 | 50 | 52 |

METHOD AND SYSTEM FOR CONSTRUCTING PERSONALIZED RESULT SETS

FIELD OF THE INVENTION

This invention relates to computer systems and, more particularly, to computer systems for delivering targeted content.

BACKGROUND OF THE INVENTION

Requirements for building web-based applications call for generating experiences which are highly customized for each individual user. The construction of this experience relies on many factors, including delivering personalized content through the user interface, giving some people specific privileges (such as receiving a promotion), and customizing business logic on an individual basis.

Typically, these processes are based on complex logic, and are implemented through application code processes. However, the person who makes the decisions as to these behaviors is often non-technical. This personalization manager defines the end-goal and requires a developer to write custom code to execute the vision. With the importance of "time to market," a process that allows the personalization manager to define and execute his or her goal without technical development resources can determine whether a project is successful.

SUMMARY OF THE INVENTION

According to the present invention, a method and system for constructing personalized or other targeted result sets is provided. The platform provides a general mechanism that allows a user to define business rules, and have those rules be processed in the context of an object repository., The platform permits a single framework to be used to build rules, with a simple syntax. When executed, the rules can return a variety of items depending on what object container is queried. A personalization manager can utilize the same rule syntax to construct, for example, sets of personalized documents, personalized promotions (e.g., coupons), custom pricing models (e.g., custom catalog pricing), or specific instances of application functionality (e.g., a set of instantiated Java objects). The rules can consider attributes of content and attributes of a user's profile. Also, rules can consider date, time, or environment conditions. The rules can be reused or modified easily, and can be inserted as portions of other rules.

The engine that manages the runtime process of executing the rules is able to integrate with external legacy systems. These external legacy systems include simple file systems, content management servers, relational databases, and mainframes. The schema that represent the attributes of the elements in the repository are not fixed. Each repository is able to define its own data model and the engine is able to expose that data model to the running environment. This introspection capability allows tools to be built that help the personalization manager form the correct business rules within the context of the desired repository.

DETAILED DESCRIPTION OF PREFERRED EMBODIMENTS

Figure 1:
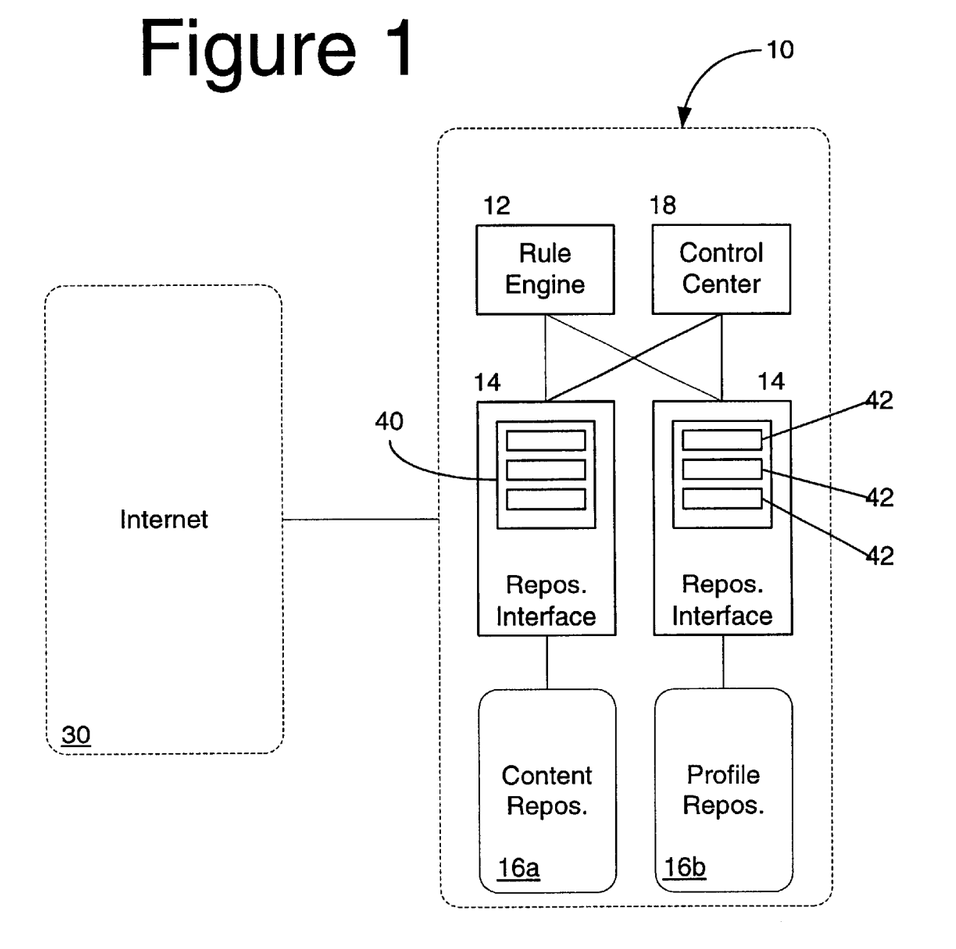
FIG. 1 is a block diagram of a computer system according to an embodiment of the present invention.

As shown in FIG. 1, a computer system 10 employed at a web site and connected to the Internet (depicted in block form as block 30) includes a rule engine 12, one or more repository interfaces 14, one or more repositories 16, and control center 18. Rule engine 12, repository interfaces 14, and control center 18 run on one or more servers.

Typically, the system includes a content repository 16a and a profile repository 16b. The profile repository 16b contains profile information about users of the system, such as name, age, gender, favorite activities, items recently purchased, and web pages visited. The content repository 16a organizes, stores, and maintains discrete units of information (content), such as a prospectus, a product listing in a catalog, or a movie review. Each unit of content, or content item, may be of a specific type, such as an HTML file, an image, a PDF document, or a video clip. Each content item has a set of attributes, or meta-data, which can be used to search for specific content. The content attributes may include, for example, "author," "length," "intended audience," and "keywords." Content items can be organized hierarchically into folders and sub-folders. Search criteria can include whether an item is within a folder or sub-folder.

When a content item is displayed, such as in an HTML page, the content of the display is taken from the attributes of the content item. For example, if a content item represents the listing for a product in a catalog, that item may include the attributes "product name," "price," and "description." Displaying the product on a page involves extracting the values of the appropriate attributes and formatting them into an HTML layout. Additionally, the content item itself may be presented if it is an HTML page, an image, or any other document or item that can be displayed or otherwise presented.

A repository interface 14 provides an interface between specific legacy repositories and the rule engine 12. The repository interface permits the rule engine, and the rules themselves, to be independent of the repositories and to be reused if a repository system is changed or replaced.

The repository interface maintains an item descriptor data structure 40. Each different type of element in a repository has an item descriptor 42. The item descriptor (shown in FIG. 3) for a type of element identifies the attributes 44 of the type of element and the data type 46 of each attribute value. Thus, the item descriptor allows the control center 18 (or another application) to learn at runtime what attributes are available for the type of element. For example, content items that are of the type "book" might have as attributes "author," "published date," "keywords," "title," and "summary." The item descriptor also allows the control center to learn the data type of each attribute value. For example, "author" and "title" may each be a String, the "published date" may be a Date object, and "keywords" may be an array of Strings.

Figure 3:
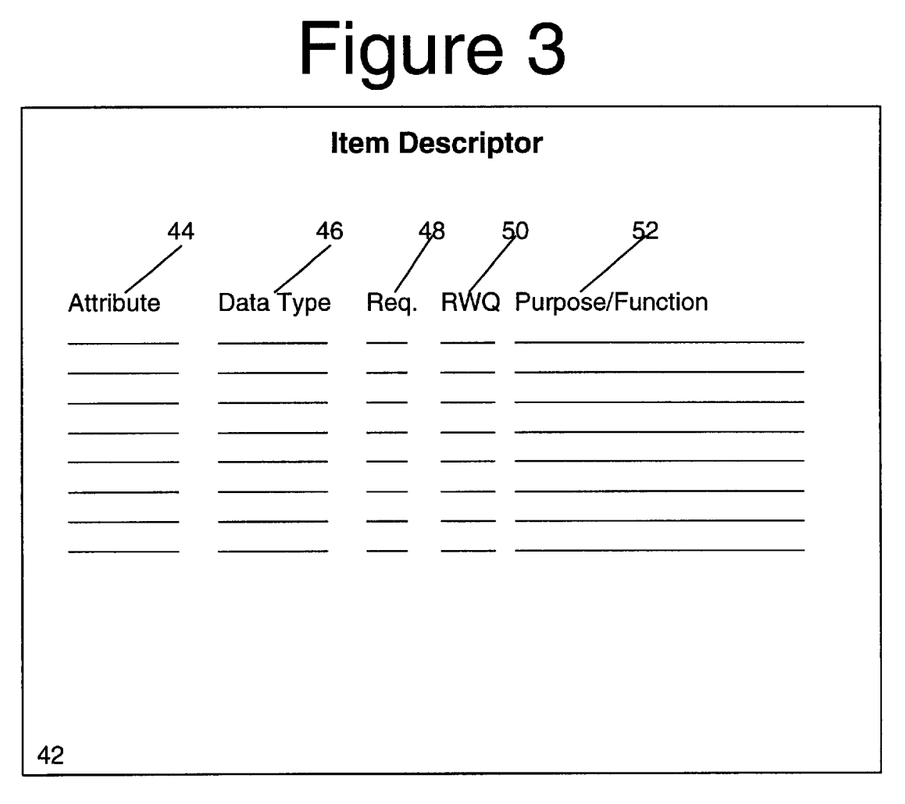
FIG. 3 is a diagram of a structure for implementing a computer system according to an embodiment of the present invention.

In addition to identifying the attributes and the data types of each attribute value, each item descriptor 42 also may identify whether an attribute is a required field 48; whether it may be read, written to, and/or queried (field 50); and a description of the purpose or function of the attribute 52.

Figure 4:
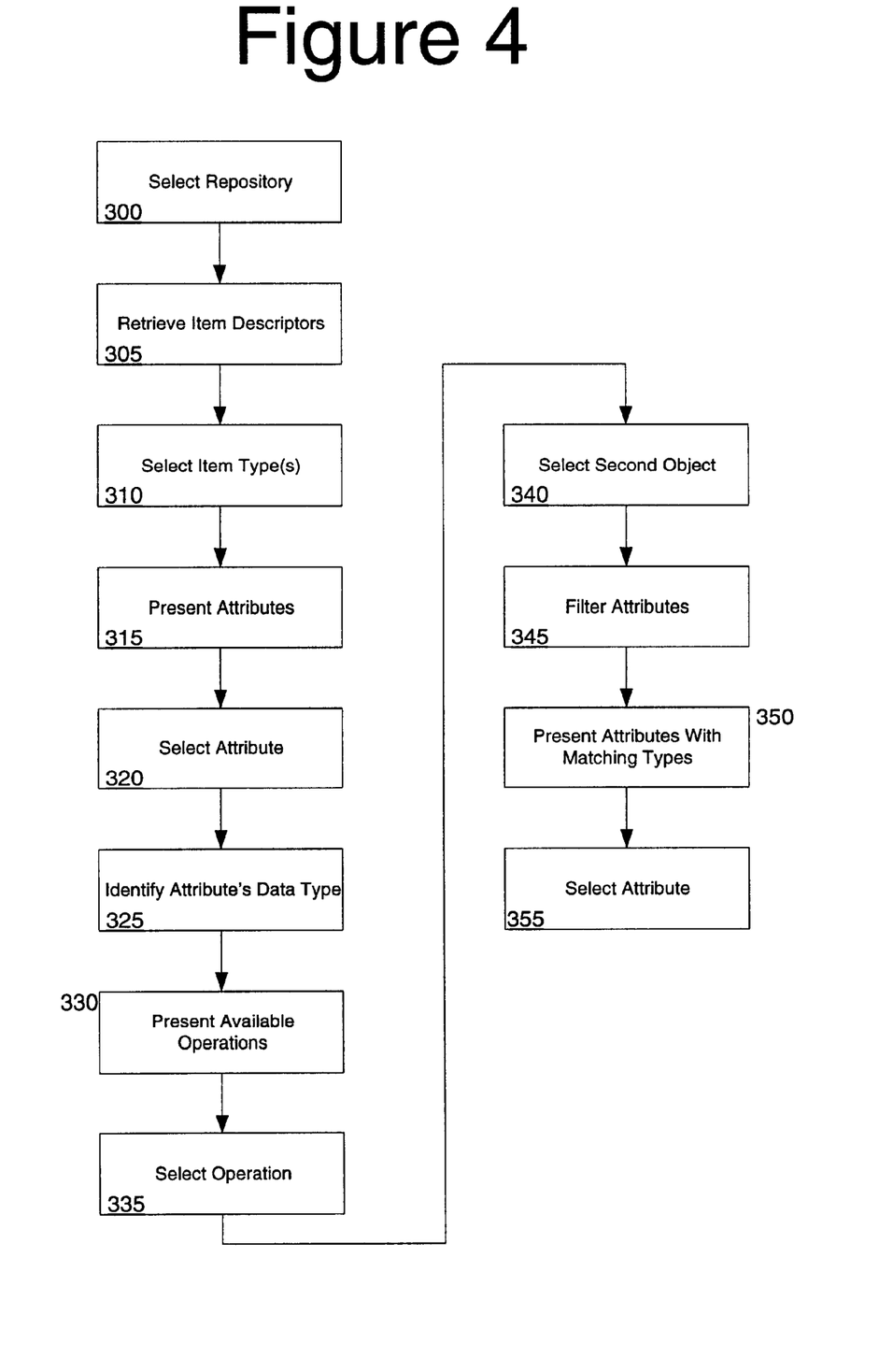
FIG. 4 is a diagram of steps performed according to an embodiment of the present invention.

The control center provides an interface for setting up targeting and segmentation rules (which are described below). As shown in FIG. 4, in order to build a business rule, a user, using control center 18, selects a repository of interest (step 300). Control center 18 retrieves the item descriptors 42 from repository interface 14 (step 305) and permits the user to select, if appropriate, a particular item type or types (step 310). Then, at step 315, control center 18 presents a set of choices of attributes to the user, using the item descriptors for the selected types. When a user selects an attribute (at step 320), control center 18 identifies the data type of the attribute (step 325), and presents to the user the operations that are available on that data type (step 330). Thus, in a preferred embodiment, the user is presented only the particular attributes that are available, and only the particular operations that may be performed on those attributes.

Typically, operations will involve some form of comparison of an attribute of one object to an attribute of another object. After the user selects an operation (step 335), the user selects the second object for the comparison (step 340). This may involve selecting a different repository. In this case, control center 18 filters the complete set of attributes (step 345), and presents to the user only the attributes that match the data type of the first attribute selected (step 350). The user then selects the second attribute (step 355). This filtering process reduces the likelihood that a rule will contain errors.

The business rules are contained in a set of data structures that are stored in external configuration files. Preferably, the configuration files contain a Standard Generalized Markup Language (SGML) syntax that represents the business rules. Alternatively, any other suitable syntax could be used. The rules preferably contain a mix of Boolean logic (AND, OR, and NOT) and comparison operators (e.g., equals, less than, greater than or equal to, includes, is between, starts with). Rule engine 12 parses the SGML syntax to build a tree-like data structure in memory that represents the desired logic. Preferably, the rules are defined in a human-readable text file.

Business rules can relate to a variety of conditions. Preferably, the rules include content conditions, which relate to aspects of content stored in a repository; user conditions, which relate to profile or other information stored about a user; date and time conditions, which relate to the date (e.g., specific days of the week, the first day of the month, or specific months) or time (e.g., after 7:00 p.m. or between 9:00 a.m. and 5:00 p.m.); and environment conditions, such as the type of browser or speed of a modem that is being used.

The rules include both accept rules and reject rules. The rules may test, for example, whether an attribute of the content matches a value input by the user or whether an attribute of the content matches an attribute of the user's profile. With an accept rule, if the conditions are met the content is returned. With a reject rule, if the conditions are met then the content is excluded. For example, a reject rule might exclude content that otherwise matches the specified criteria but is rated R (assuming a content attribute is "rating") if the user's age (from the user's profile) is less than 17.

In the following example rule, the "target" keyword of the valueof tag indicates an attribute of the elements contained in the repository. The "constant" keyword defines an object value that is fixed and does not need to be determined at runtime. The "bean" keyword references objects that should be resolved in the context of executing the business rule. Bean tag values are determined during the execution of the rule. In the example, a context object (described below) named Profile represents the user during the processing of the rule. The sorting directive declared in the sortby tag specifies that the targeting results are to be sorted first by the "lastModified" property, from most recent to oldest, and secondarily by the name property of the target objects, in alphabetical order.

The rule:

if it is available AND if the content's author matches the user's favorite author BUT NOT if the content is rated R and the user's age is less than 17 AND NOT if the content is rated X and the user's age is less than 18

Is translated into:

```
<ruleset>
    <!-- accept rules -->
    <accepts>
        <rule op=and>
            <rule op=eq>
                <valueof target="available">
                <valueof constant="true">
            </rule>
            <rule op=eq>
                <valueof target="author">
                <valueof bean="Profile.favoriteAuthor">
            </rule>
        </rule>
    </accepts>

<!-- reject rules -->
    <rejects>
        <rule op=and narne="Rated R">
            <rule op=lt>
                <valueof bean="Profile.age">
                <valueof constant="17">
            </rule>
            <rule op=eq>
                <valueof target="rating">
                <valueof constant="R">
            </rule>
        <rule op=and name="Rated X">
            <rule op=lt>
                <valueof bean="Profile.age">
                <valueof constant="18">
            </rule>
        </rule op=eq>
                <valueof target="rating">
                <valueof constant="X">
            </rule>
        </rule>
    </rejects>

<!-- sorting directives -->
    <sortby>
        <sortbyvalue value="lastModified" dir=descending>
        <sortbyvalue value="name" dir=ascending>
    </sortby>
</ruleset>
```

As this example illustrates, "rule" tags can be nested. Preferably, at most a single "accepts" tag and at most a single "rejects" tag is used, each containing one or more "rule" tags. In addition to the "accepts" and "rejects" sections, a rule set may have an "includes" section. The "includes" tag is used to include one or more rule sets within another rule set. The syntax for using an "includes" tag is:

<includes>
        <ruleset src="{rule set name}">
    </includes>

Multiple "ruleset" lines may be included within the "includes" section.

Similarly, individual rules can be included in the "accepts" or "rejects" sections by referencing the name of the rule. The syntax for including a previously named rule is:

<rule src="{rule name}"></rule>

Preferably, if no value is included in the target (that is, the target has a null value), such as because a user did not provide his or her age or the author of a work was not provided, the repository item is not included in the targeting results because it is not known whether the item meets the criteria. However, a rule can test whether the value of a target is a null value. By using an appropriate OR operation, items with null values can be included in the results.

As the above example also illustrates, context objects have their own attributes, which can be referenced within the rule syntax. The rule engine resolves the names and retrieves the appropriate values of the context object when the rule is processed and places those values into the rule data structure for evaluation. If personalization is to be used when returning content, then one of the context objects may resolve to the user accessing the application, with attributes corresponding to the information in the user's profile. Another context object may be the user's shopping cart. If the personalization will be based in part on the number of products in the user's shopping cart, then a rule may involve a comparison to the corresponding attribute. For example, one line of the resulting rule might read:

<valueof bean="ShoppingCart.numProducts">

The rule engine executes a rule definition within an appropriate context and transforms the business rule into a query that can be executed against the data store to return the dynamic result set. In a preferred embodiment, the rule engine performs the following steps in order to process a business rule.

Figure 2:
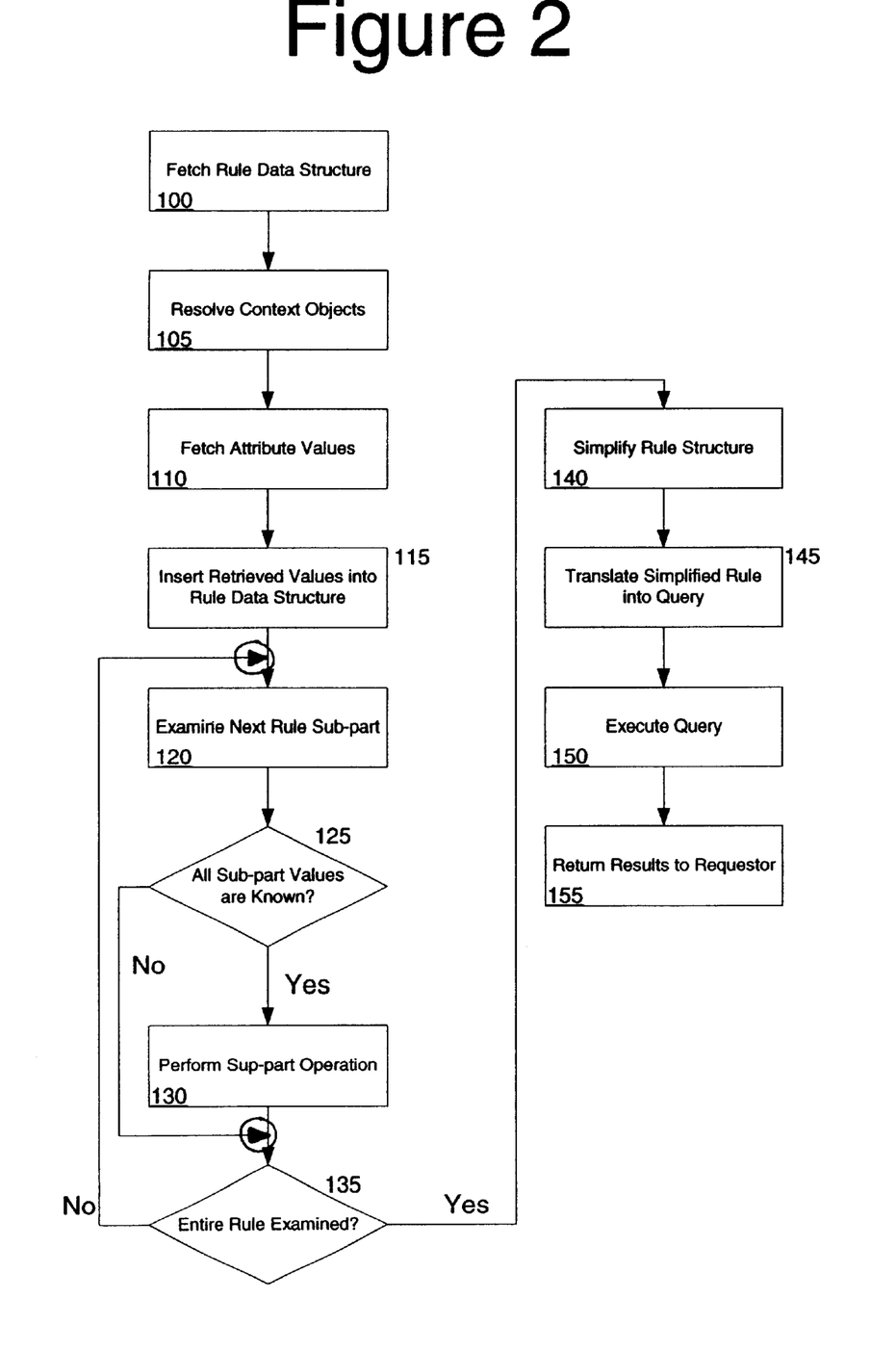
FIG. 2 is a diagram of steps performed according to an embodiment of the present invention.

First, as shown in FIG. 2, the rule engine fetches (step 100) the complete rule data structure, which represents the desired business rule. Then, the rule engine transforms the data structure by recognizing and resolving context objects (step 105), fetching the indicated attribute values (step 110), and inserting ("inlining") the retrieved values into the data structure (step 115).

Preferably, after context object values have been resolved, the rule data structure is optimized, by determining which sub-parts of the rule can be processed immediately without accessing the content repository. For example, if part of the rule does a comparison test between a context value and a constant, both values are known at this point. Thus, the comparison operation can be performed. Preferably, to do this the rule engine examines (step 120) each sub-part of the rule, and determines (step 125) whether all of the values have been resolved. Alternatively, at step 125, the rule engine needs only to determine whether sufficient values have been resolved to process the sub-part. Where the sub-part's operation can be performed, the rule engine performs that operation (step 130). This optimization process continues until the entire rule has been analyzed (step 135).

At step 140, the result of the comparison may allow the rule data structure to be pruned further or cause the complete execution to be stopped immediately. If, for example, a portion of the rule involves an AND operation, where one element of the operation is resolved to be false based on context object values and the other element of the operation is dependent on values obtained from the content repository, then the AND operation necessarily will be false. Therefore, it is unnecessary to invoke that portion of the rule, and accessing the content repository for the information in that portion of the rule can be avoided. This example is illustrated below, where the rule returns a set of items whose author matches the user's favorite author (an attribute of the user's profile), but the information is available only to members, as opposed to guests, to a web site. If the user is not a member, it is unnecessary to search for items by the user's favorite author.

```
<rule op=and>
    <rule op=eq>
        <valueof target="author">
        <valueof bean="Profile.favoriteAuthor">
    </rule>
    <rule op=eq>
        <valueof bean="Profile.member">
        <valueof constant="true">
    </rule>
</rule>
```

When the rule is defined, the user is unknown and therefore the Profile attribute values that will be used are unknown. However, at runtime, the Profile values can be inserted into the data structure. For example, if the user's favorite author is William Shakespeare, but the user is not a member, then the rule translates to:

```
<rule op=and>
    <rule op=eq>
        <valueof target="author">
        <valueof constant="William Shakespeare">
    </rule>
    <rule op=eq>
        <valueof constant="false">
        <valueof constant="true">
    </rule>
</rule>
```

In this example, the second part of the AND operation is false, and therefore the entire portion of the rule is false and can be omitted from further processing. However, if the rule involved an OR operation between this portion and other portions, then the other portions might still need to be processed.

After the rule has been optimized, the resulting data structure is translated (step 145) into a query that can be sent to the repository and will return the correct content elements. If, in the above example, the user was a member, then the resulting optimized rule would be:

```
<rule op=eq>
    <valueof target="author">
    <valueof constant="William Shakespeare">
</rule>
```

The optimized rule is translated from this rule data structure into a new data structure that the repository understands and can use to send the query to the repository. A repository interface is written for the particular repository for which it will interface, to perform the translation of the rule data structure into the native query language for the repository. This permits the rule engine to have a single rule syntax that is independent of the different systems to which it is applied, and allows the same rules to be reused with different legacy systems.

For example, if the repository is based on a relational database that is accessed with a Stuctured Query Language (SQL) statement, the above rule might result in the following SQL statement:

SELECT * FROM items WHERE author='William Shakespeare'

After the rule engine has performed the translation, using the repository interface, it takes the new query data structure and forwards it to the repository. The repository then executes the query (step 150) against the contents (such as a database), gathers the results, and returns the results to the rule engine. The rule engine, in turn, returns the results to the user or to another application (step 155). Optionally, the rule engine performs transformations on the results before returning the results. If, for example, the results are content, they may be inserted into an HTML document that is returned to the user's browser.

If each item has a unique identifier, then the identifiers of objects that are found in response to a query can be used to retrieve the object at a later time. For example, a rule might return a set of promotions that a user can receive. To "give" these to the user, the unique identifier of each promotion object can be saved in the user's profile. Subsequently, the promotions can be used by loading them from a promotions repository using the saved identifiers in the user's profile. In addition, the identifier could be used to access a specific repository item and determine if it matches certain criteria. For example, the promotion may only be available at certain times or days of the week, as specified by attributes in the promotions repository.

This rule structure also permits items contained in a data store, or repository, to be segmented according to their own attributes. For example, a content management system may hold documents, where each document has a "type" attribute that is part of its meta-data. The document types may include "marketing" and a variety of technical types, such as "operating systems" or "computer graphics."

The rule structure can be used, in this example, to construct marketing and white papers segmentations. The following rule syntax would create a marketing segmentation.

```
<rule op=eq>
    <valueof target="type">
    <valueof constant="Marketing">
</rule>
```

Similarly, the following rule syntax could be used to create a white papers segmentation, which includes documents directed to operating systems or computer graphics.

```
<rule op=or>
    <rule op=eq>
        <valueof target="type">
        <valuedf constant="Operating Systems">
    </rule>
    <rule op=eq>
        <valueof target="type">
        <valueof constant="Computer Graphics">
    </rule>
</rule>
```

This rule could be modified easily, if desired, to include or remove specific categories of technical documents.

Similarly, segmentation may be performed by user. If a repository is used to define all users of a web site, then a marketer can create business rules that segment the users into specific demographic segments. For example, to define a business rule that segmented all New Englanders the following rule could be used.

```
<rule op=or>
    <rule op=eq>
        <valueof target="State">
        <valueof constant="CT">
    </rule>
    <rule op=eq>
        <valueof target="State">
        <valueof constant="MA">
    </rule>
    <rule op=eq>
        <valueof target="State">
        <valueof constant="ME">
    </rule>
    <rule op=eq>
        <valueof target="State">
        <valueof constant="NH">
    </rule>
    <rule op=eq>
        <valueof target="State">
        <valueof constant="RI">
    </rule>
    <rule op=eq>
        <valueof target="State">
        <valueof constant="VT">
    </rule>
</rule>
```

Executing this rule would return all users who resided in New England. This, in turn, could be used as part of a broader rule. For example, users who resided in New England might receive content relating to that region. To simplify this process, new attributes can be defined. For example, the attribute livesInNewEngland might be based on the above rule. Then, the above rule could be used as part of a larger rule by including the following simpler rule.

```
<rule op=eq>
    <valueof target="livesInNewEngland">
    <valueof constant="true">
</rule>
```

This segmentation mechanism can be applied in combination with a context object to match a user or the current conditions with a user repository. For example, the following rule would match a user to people who have one or more favorite sports in common.

```
<rule op=includesAny>
    <valueof target="favoriteSports">
    <valueof bean="Profile.favoriteSports">
</rule>
```

While there have been shown and described examples of the present invention, it will be readily apparent to those skilled in the art that various changes and modifications may be made therein without departing from the scope of the invention as defined by the appended claims. For example, the above rule structure can be used in different targeting contexts. For example, it can be used with content accessed over the world wide web and to create targeted electronic mail. Rules can be inserted into an e-mail message template, so that, for example, the resulting message is personalized based on the recipient's profile. Also, although a specific rule syntax and specific rule constructs are described above, the invention is not limited to any specific syntax or rule construct. Accordingly, the invention is limited only by the following claims and equivalents thereto.

What is claimed is:

1. A computer system for executing rules comprising:

a rule engine;

at least one repository interface coupled to the rule engine; and at least one repository, each repository being coupled to the respective repository interface;

wherein the rule engine is programmed to execute a repository-independent rule having at least one reference to profile information, obtain from one of the repository interfaces a translation of the rule into a repository-specific query, forward the query to the corresponding repository, and receive back from the corresponding repository a targeted result set;

wherein the repository-independent rule includes an attribute portion and a variable portion, said attribute portion references information about repository content or a user, and said variable portion references one or more values provided by the user; and wherein each repository interface is programmed to translate a repository-independent rule into a repository-specific query.

2. The computer system of claim 1, wherein the repository-independent rule includes an accept rule portion and a reject rule portion.

3. The computer system of claim 2, wherein the repository-independent rule further includes a reference to an included rule.

4. The computer system of claim 1, wherein the rule engine is further programmed to insert a result of the query into a document that can be returned to a user.

5. A computer program product, residing on a computer-readable medium, for use in a system for interacting with one or more users over a network, the computer program product comprising instructions for causing a computer to:

translate a rule having a content portion and a profile portion into a repository-specific query;

execute the repository-specific query; and obtain a targeted result set in response to executing the query;

wherein said profile portion references information about a user and said content portion references information about repository content.

6. A method for constructing a targeted result set comprising the steps of:

translating a repository-independent rule having at least one content portion and at least one profile portion into a repository-specific query;

executing the repository-specific query; and constructing a targeted result set from the results of executing the repository-specific query;

wherein said profile portion references information about a user and said content portion references information about repository content.

7. A method for constructing a targeted result set comprising the steps of:

translating a repository-independent rule having a content portion and a context reference into a target repository-specific query;

forwarding the query to the target repository; and receiving a targeted result set in response to forwarding the query;

wherein said content portion references information about repository content.

8. The method of claim 6, wherein the profile portion includes one or more attributes of a user profile.

9. The method claim of 6, wherein the step of constructing a targeted result set includes excluding content having an attribute that does not match a user attribute identified from the profile portion.

10. The method of claim 6, wherein the step of constructing a targeted result set includes including content having an attribute that matches a user attribute identified from the profile portion.

11. The method of claim 6, further comprising the step of building a repository-independent rule.

12. The method of claim 11, wherein the step of building a repository-independent rule includes providing a list of attributes of the content portion and a list of attributes of the profile portion.

13. The method of claim 11, wherein the step of building a repository-independent rule includes providing a list of attributes of a first item type and, in response to a selection of a first attribute from the list of attributes, providing a list of operations that may be performed on the first attribute.

14. The method of claim 13, wherein the step of building a repository-independent rule further includes providing a list of attributes of a second item type, wherein the list of attributes of a second item type is limited to attributes having a data type that is the same as a data type of the first attribute.

15. A method for constructing a targeted result set comprising the steps of:

translating a repository-independent rule having a content portion and a context reference into a target repository-specific query;

executing the repository-specific query; and receiving a targeted result set in response to executing the query.

16. The method of claim 15, wherein the context reference includes a reference to profile information about a user.

17. The method of claim 15, wherein the context reference includes a reference to at least one of a date condition and a time condition.

18. The method of claim 15, wherein the context reference includes a reference to one or more environment conditions.

19. The method of claim 18, wherein the reference to one or more environment conditions includes a reference to a type of browser.

20. The method of claim 15, wherein the step of executing the repository-specific query includes inserting into the repository-specific query a value in place of the context reference.

21. The method of claim 20, wherein the step of executing the repository-specific query further includes processing a portion of the repository-specific query that contains the value in place of the context reference.

22. The method of claim 21, wherein processing a portion of the repository-specific query includes processing a portion of the repository-specific query without accessing a content repository containing content referenced in the portion of the repository-specific query.

23. The method of claim 20, wherein the step of executing the repository-specific query includes determining whether a portion of the repository-specific query containing a reference to a content object can be resolved without accessing the content object.

* * * * *

Disclaimer

6,587,849 — Robert Mason, Somerville, MA (US); Natalya Hung, Foster City, CA (US); Joseph Berkovitz, Sudnitu, MA (US). METHOD AND SYSTEM FOR CONSTRUCTING PERSONALIZED RESULT SETS. Patent dated Jul. 1, 2003. Disclaimer filed Dec. 6, 2004, By the Assignee, Art Technology Group, Inc.

Hereby enters this disclaimer to claims 7-23, of said patent.

*(Official Gazette May 10, 2005)*